(12) United States Patent
Stagliano, Jr.

(10) Patent No.: US 8,432,306 B2
(45) Date of Patent: Apr. 30, 2013

(54) METHOD AND APPARATUS FOR THE NOWCAST OF LIGHTNING THREAT USING POLARIMETRIC RADAR

(75) Inventor: James J. Stagliano, Jr., Woodstock, GA (US)

(73) Assignee: Propagation Research Associates, Inc., Marietta, GA (US)

( * ) Notice: Subject to any disclaimer, the term of this patent is extended or adjusted under 35 U.S.C. 154(b) by 273 days.

(21) Appl. No.: 12/905,762

(22) Filed: Oct. 15, 2010

(65) Prior Publication Data

US 2011/0090111 A1    Apr. 21, 2011

Related U.S. Application Data

(60) Provisional application No. 61/252,486, filed on Oct. 16, 2009.

(51) Int. Cl.
*G01S 13/00* (2006.01)
(52) U.S. Cl.
USPC ......................................... 342/26 R; 342/176
(58) Field of Classification Search .................... 342/26, 342/176
See application file for complete search history.

(56) References Cited

U.S. PATENT DOCUMENTS

2011/0074814 A1 * 3/2011 Kelly et al. .................... 345/629

* cited by examiner

*Primary Examiner* — Timothy A Brainard
(74) *Attorney, Agent, or Firm* — Alston & Bird LLP

(57) ABSTRACT

A system and method for predicting the probability of cloud-to-ground lightning strikes, 'frequent', more than 2 strikes per minute on average, cloud to ground lightning strikes, and/or 'numerous', more than 4 strikes per minute on average, through the use of polarimetric radar is presented. The data volume created by the polarimetric radar is processed to identify the type of hydrometeors in each range cell. For each vertical column, the maximum height of the graupel is compared to the lowest height of ice crystals in the volume. In the event that the lowest height of ice crystals is ambiguous, the height of the temperature where ice crystals form, −10° C., may be substituted for the lowest height of the ice crystals. Probability density functions are applied to the height difference to determine the probability of cloud to ground lightning within the column. Lightning probability product data are displayed on a visualization system in a georeferenced manner providing georeferenced lightning warnings. A forecast of the probabilities of cloud-to-ground lightning is determined by simple translation using storm track properties.

20 Claims, 10 Drawing Sheets

METHOD AND APPARATUS FOR THE NOWCAST OF LIGHTNING THREAT USING POLARIMETRIC RADAR

CROSS-REFERENCE TO RELATED APPLICATIONS

This application claims the benefit of U.S. Provisional Application No. 61/252,486, filed Oct. 16, 2009, the contents of which are incorporated herein in their entirety.

GOVERNMENT LICENSE RIGHTS

This invention was made with government support under Contract WC133R-08-CN-0142 awarded by the National Oceanic and Atmospheric Administration (NOAA). The government has certain rights in the invention.

TECHNICAL FIELD

The present invention relates to meteorological forecasting and warning systems. Particularly the present invention provides a method and apparatus for nowcasting lightning threat to a high degree of accuracy over an extensive geographical area.

BACKGROUND OF THE INVENTION

The Cloud-to-ground (CG) lightning causes nearly a billion dollars of property damage and approximately 90 fatalities per year in the United States, second only to flooding. Yet the lightning warning facilities as implemented are minimal at best. On military bases, where lightning strikes can have a devastating effect if a munitions depot is struck, base-wide warnings are issued if lightning strikes are observed with 5 miles of the base. Some amateur athletic associations also require lightning detectors for athletic contests; detections result in delayed games while participants and fans clear the field. These warnings do not go out to the general public who may have no knowledge of impending lightning threats. In addition, this system relies on previous strikes within the area and therefore the potential before a strike is unknown.

A significant source of lightning concern is sporting activities that are played in open areas such as baseball, softball, football, soccer, and golf. In 1997, NOAA conducted a study of 3,239 lightning deaths over 35 years. They found that five times more people are killed by lightning in open fields or parks. Playgrounds and parks accounted for nearly 27% of lightning deaths, and golfers accounted for only 5% of deaths during the period.

There are two categories of devices that seek to provide a prediction capability of lightning threat, systems that predict lightning threat based upon a history of strikes and those that predict lightning threat before or independent of any strikes. The former typically utilize radiofrequency (RF) sensors to detect and characterize the electromagnetic pulse created by the lightning discharge. The latter attempt to forecast lightning threat based upon the atmospheric conditions measured through a variety of sensors including, but not limited to, electric field sensors, radar, radiosonde, radiometers, satellite, sodar, and weather stations sensors. The present invention relates to this category of devices.

Post-strike sensors detect the electromagnetic pulse resulting from the lightning discharge and associate the pulse characteristics with the lightning. The devices range in size from a hand held device that estimates range based upon an amplitude threshold to large, distributed networks of sensors that receive the energy from the lightning pulse at different times and perform time of arrival calculations to determine location. Many of these sensors detect the transient variations in magnetic field resulting from the pulse. These sensors however are very sensitive to metallic structures and other magnetic anomalies, thereby reducing their reliability. Electric field sensors are more susceptible to noise and thus require significant bandpass filtering to ensure detection.

Prestrike prediction uses knowledge of the atmospheric conditions to forecast lightning threat. These systems are useful in that they can make a forecast before the first strike. Electric field sensors such as the E-field mill sensor measure the static background electric field. As charge separation occurs within the cloud, the electric field within the cloud and between the cloud and ground increases. Once the electric field reaches a particular threshold, called the breakdown threshold, discharge may occur. So, the electric field sensors measure the magnitude of the electric field at the ground in the hopes that a significant electric field is enough to forecast lightning. Unfortunately, electric field values alone are insufficient to forecast lightning.

Obtaining soundings of the atmosphere has been the standard technique of obtaining measurements of atmospheric parameters of different altitudes. These measurements are obtained by releasing a high altitude balloon with an instrument package called a radiosonde. The radiosonde transmits the measurements (hence the radio) to a base station. These profiles are obtained at stations throughout the country twice a day at 0000 UTC and 1200 UTC. The profiles are the atmospheric parameters measured as a function of altitude and include quantities such as temperature, pressure, humidity, dew point, mixing ratio, wind speed and direction. One value determined from these parameters is called the convective available potential energy (CAPE). The CAPE is related to how quickly storms will develop vertically. A very high CAPE indicates highly unstable air and a significant potential for storm development and lightning. Unfortunately, like many atmospheric parameters, the interpretation of the CAPE is very dependent upon a region's underlying climate.

With the advent of digital processing of radar data in the 1980's, meteorological radar products greatly enhanced the ability of the world's meteorological services to provide warnings of severe weather conditions associated with convective cells. This includes but is not limited to tornados, wind shear, microbursts, gust fronts, hail, and lightning. The weather radar performs a number of surveillance scans in 360 degrees of azimuth at different elevations. Each set of elevation scans is considered a volume. The radar products are the result of computer-processing of this volumetric data. For lightning forecasting typical modules considered used the Echo Tops (ETOPS) and Vertically Integrated Liquid (VIL) products as proxies for lightning potential. The ETOPS product is the maximum height observed for reflectivities (signal powers) above a certain threshold. The VIL product is the integration of liquid water content (related to the reflectivity) in a vertical column. The ETOPS products give a measure of the strength of the convection. The higher in the atmosphere the reflectivity the stronger the convection and hence the greater likelihood of lightning. The VIL gives a measure of the potential energy in the atmosphere. The greater the VIL, the more water content and hence the more potential energy available for lightning to develop. Both these products by themselves or together with no additional information provide a good measure of the lightning threat level at very high flash rates but are ineffective for low flash rates, i.e. as the storm is developing.

Adding supplementary information about the atmosphere to the radar product generation greatly enhances the ability to forecast lightning. In particular the altitude at which ice crystals form, e.g. the −10° C. level, compared to the ETOPS with a threshold of 40 dBZ is related to the likelihood of cloud-to-ground lightning Wolf empirically determined probability density functions for the cloud-to-ground lightning threat (see Wolf, P., 2007: Anticipating the Initiation, Cessation, and Frequency of Cloud-to-Ground Lightning, Utilizing WSR-88D Reflectivity Data, National Weather Association, http://www.nwas.org/ej/2007/2007.php). Stagliano implemented the module and showed that if such a product was available on Sep. 11, 2008 the initial discharge from a convective cell could have been forecast and a middle school football field that was struck could have been cleared in time (see Stagliano, J., B. Valant-Spaight, J. C. Kerce, 2009: "Lightning Forecasting Before The First Strike", 4$^{th}$ *Symposium on Meteorological Uses of Lightning Data,* 11-15 January, Phoenix, Ariz.).

The techniques described by Wolf and implemented by Stagliano require knowledge external from the radar which is typically found through soundings that are spatially and temporally sparse. The availability and sparseness of this data limits the functionality of the module.

BRIEF SUMMARY

Some examples of the present invention are directed to various embodiments of a system and method for nowcasting areas of probable cloud-to-ground lightning discharge by evaluating data derived from polarimetric data obtained from scanning of the atmosphere with radar equipment. In one embodiment of the invention, the radar equipment produces scans or elevation slices at different elevation angles, thereby creating a data volume representing hydrometeors present in the atmosphere. Using the resultant polarimetric variables, detected hydrometeors are classified by type. For example, the hydrometeors are classified according to whether they are rain drops, large rain drops, graupel, hail, snow, wet snow, dry snow, large hail, small hail, hail mixed with rain, etc. Hydrometeors containing graupel and ice crystals generate lightning due to interaction of the graupel and ice crystals. Accordingly, hydrometeors containing graupel and ice crystals are flagged for further processing to determine the probability of cloud-to-ground (CG) lightning strikes. The inventive systems and methods search the data volume for the highest elevation attained by the graupel and the lowest elevation of the ice crystals. Various embodiments are programmed or configured with probability density functions for determining the probability of Cloud-to-Ground (CG) lightning. In addition, these embodiments are capable of classifying the probability of CG lightning strikes in the geographic area in which the hydrometeor is present. For example, embodiments may be configured to classify 'frequent' lightning strikes as more than 2 strikes per minute average CG lightning. 'Numerous' lightning strikes may be defined as more than 4 strikes per minute average CG lightning. The inventive embodiments apply the probability density functions to the difference between the graupel height and ice crystal height. The probability density functions relate the height differences to the probability of the associated lightning threat. Various embodiments are configured with a storm track function that detects and characterizes the storm cells by their properties, including propagation speed and direction. Therefore, extrapolation and other more complex advection techniques are used to provide nowcasts for the storm cells. These techniques can be applied to the cells with developing or ongoing lightning threats.

It is possible that the radar equipment may not detect low level ice crystals, particularly in developed convective storm cells. Another variation on this invention is to input the height associated with temperature that ice crystals form. The temperature at which ice crystals form may be set to a value in the range from −20° C. to 0° C., for example, −10° C., in the absence of a significant electric field. Embodiments of the inventive system and method may apply the probability density functions to the difference between the maximum height of the graupel and the height of the crystallization level or −10° C. level to provide the CG lightning threat probabilities.

DETAILED DESCRIPTION OF EMBODIMENTS OF THE INVENTION

As used herein, the following terms have the following meanings:

'Memory' refers to any physical element capable of storing program code or data thereon. Thus, a 'memory' may refer to, individually or collectively, a random-access memory (RAM), read-only memory (ROM), field programmable gate array (FPGA), a compact disc (CD), a digital versatile disc (DVD), a hard disk drive, tape drive, or a memory card or stick, for example.

'Module' refers to the physical manifestation of program code and the portion of a memory that stores it. The module may thus be implemented as transistors or memory cells holding voltage or current logic states in a RAM or ROM, or the pits and lands on a CD-ROM, or other such physical manifestations.

'Processor' refers to any processing device capable of executing program code to process input data to generate output data. Thus, a 'processor' may be a microprocessor, a microcontroller, a field programmable gate array (FPGA), programmable logic array (PLA) or other such device.

Figure 1:
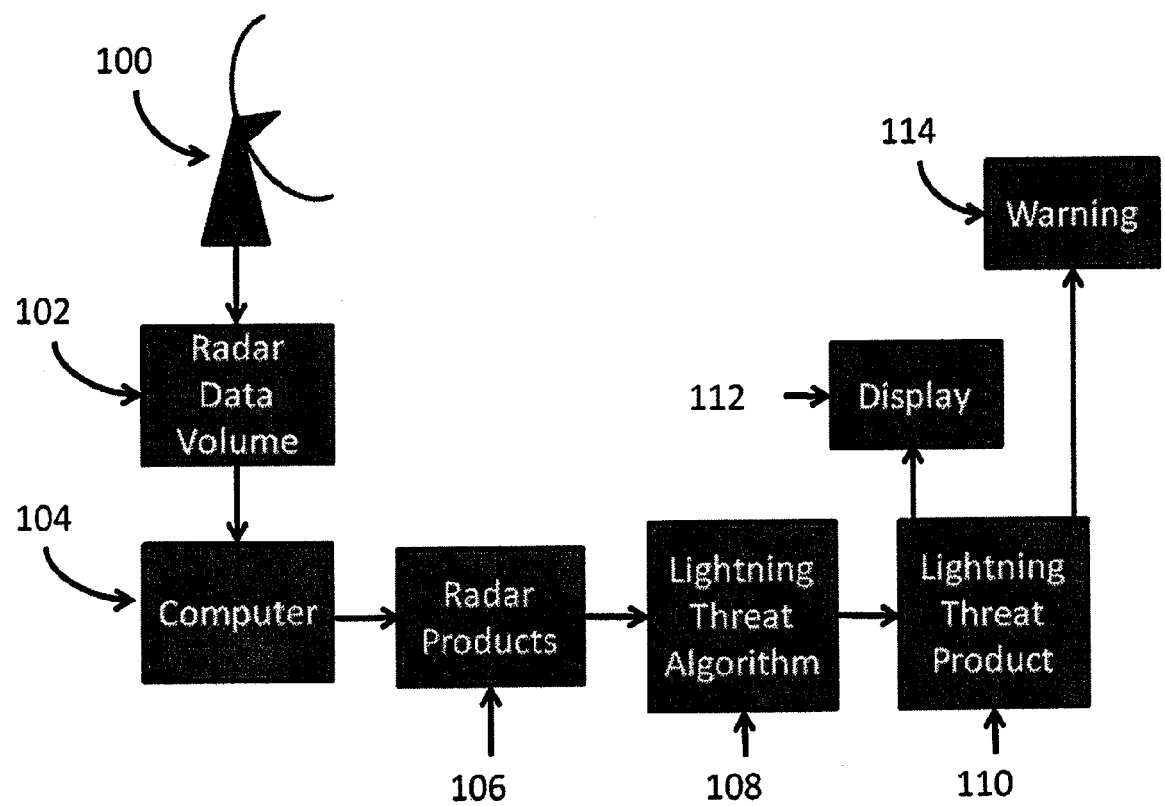
FIG. 1 is a block diagram of one embodiment of a system configured to predict the cloud-to-ground lightning threat probability using polarimetric radar data for dissemination to visualization or warning systems.

FIG. 1 shows a system to predict the probability of cloud-to-ground (CG) lightning strikes based solely upon returns from a polarimetric radar system. The radar system 100 samples the atmosphere at a number of different elevation slices to create a data volume 102. The data volume 102 is transferred to a computer system 104 that generates the radar product data 106 including the hydrometeor classification and the storm track products. Using these products, the lightning threat probability module 108 generates the lightning threat forecast data 110 for dissemination to a visualization system 112 or a warning system 114.

Figure 2:
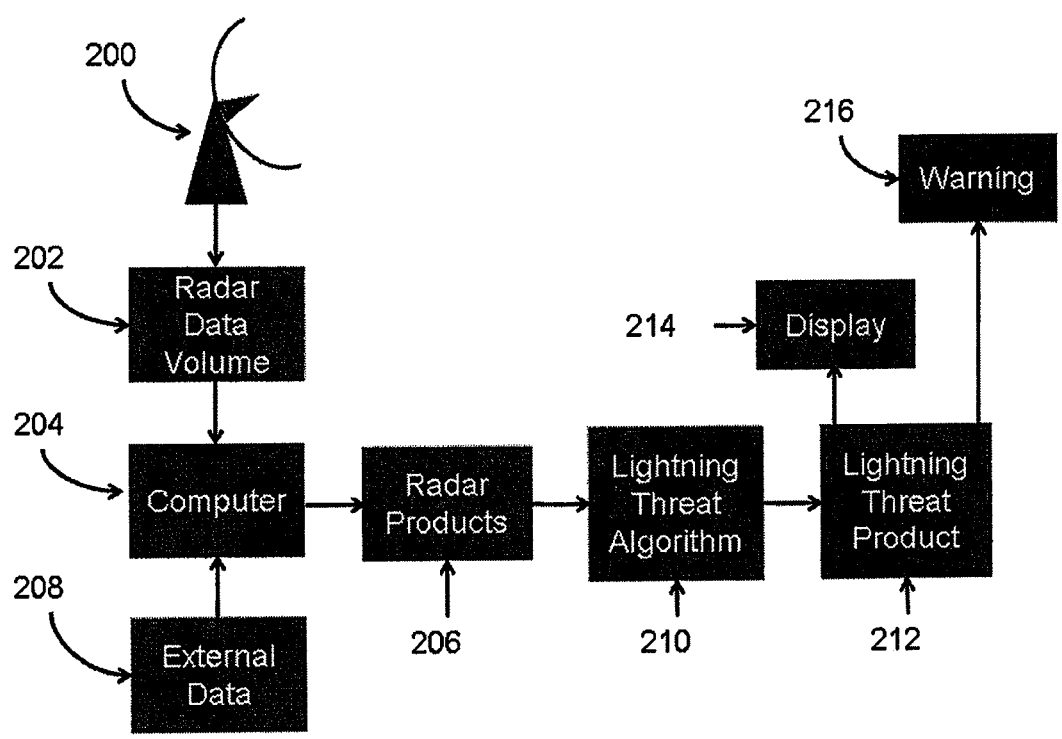
FIG. 2 is block diagram of one embodiment of a system predicting the cloud-to-ground lightning threat probability using polarimetric radar and external atmospheric information for dissemination to a visualization system.

FIG. 2 shows a system to predict the probability of cloud-to-ground (CG) lightning strikes based on returned volume data from a polarimetric radar system, and in addition, an external data source. The radar system 200 samples the atmosphere at a number of different elevation slices to create a data volume 202. The data volume 202 is transferred to a computer system 204 that generates the radar products 206 including the hydrometeor classification and the storm track products. In addition external data 208 including the height of the ice crystals, e.g., the −10° C. level, is transferred to the computer system 204. Using the radar products 206 and the external data 208, the lightning threat probability module 210 generates the lightning threat forecast data 212 for dissemination to a visualization system 214 or warning system 216.

Figure 3:
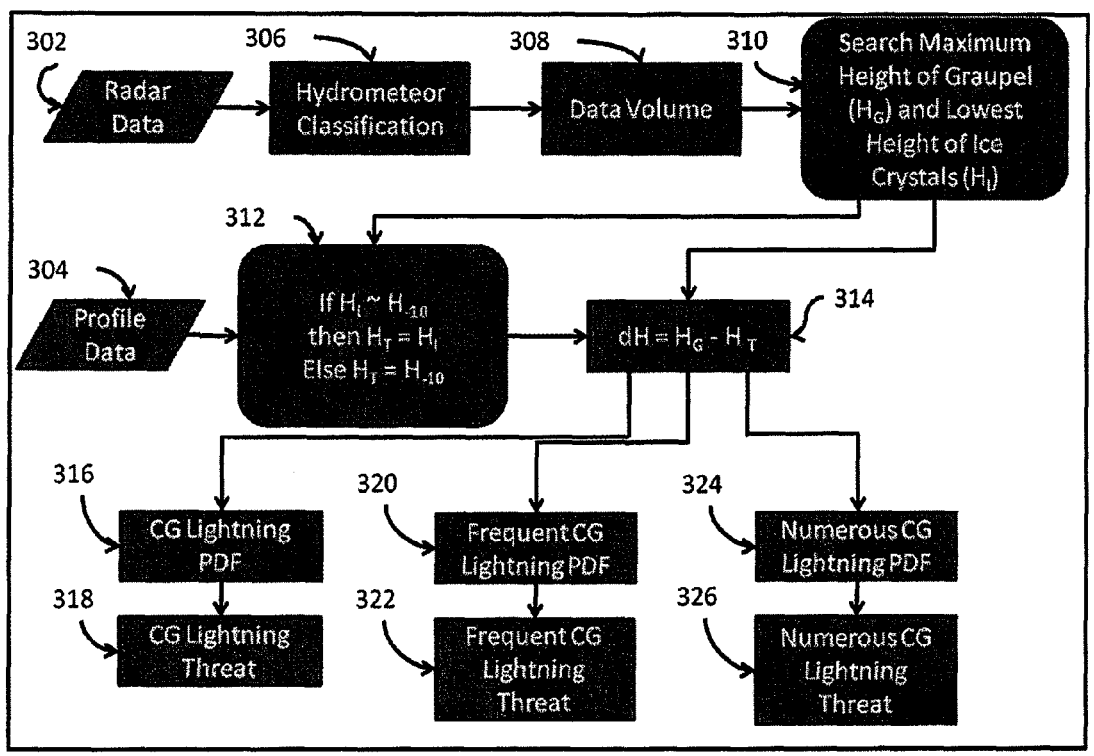
FIG. 3 is a flow diagram of a lightning threat prediction method in accordance with the invention.

FIG. 3 is a detailed flow diagram of a process 300 to predict the probability of cloud-to-ground (CG) lightning. The process 300 may be performed by the computer 104 or 204 as its processor executes program code and data from its memory. The process 300 begins with input of the polarimetric radar data 302 and external temperature profile data 304 if available. This data 302, 304 may be input from the external source via an interface (e.g., a network interface card) connected to an internal bus connecting the computer's processor and memory. Hydrometeor classification module 306 is applied to the polarimetric radar data 302 resulting in a data volume 308 with the hydrometeors classified for every sample. The data volume 308 is searched 310 for the highest altitude attained by graupel particles and the lowest altitude corresponding to the ice particles. The lowest altitude of the ice particles is checked in step 312 to determine if it is significantly different from the height of the −10° C. level. If the ice particle altitude is significantly different from the −10° C. level, then the −10° C. level is used instead of the lowest altitude of the ice particles. The height difference 314 is determined between the maximum height of the graupel particles 310 and the threshold height, whether determined to be the lowest altitude of ice particles or the −10° C. level. The probability of cloud-to-ground lightning discharge 316 is determined by applying the probability density function 318 to the height difference. The probability of 'frequent' cloud-to-ground lightning discharges (for example, more than 2 lightning strikes per minute on average) 320 is determined by applying the corresponding probability density function 322 to the height difference. The probability of numerous (more than 4 per minute on average) cloud to ground lightning discharges 324 is determined by applying the probability density function 326 to the height difference. This function repeats for every vertical column within the radar surveillance area, or at least those that could potentially generate lightning. The computer 104 or 204 may be programmed with code specifying the probability density functions 318, 322, 326 which it uses to process the height difference data 314 to generate lightning strike probability data 316, 320, 324.

Figure 4:
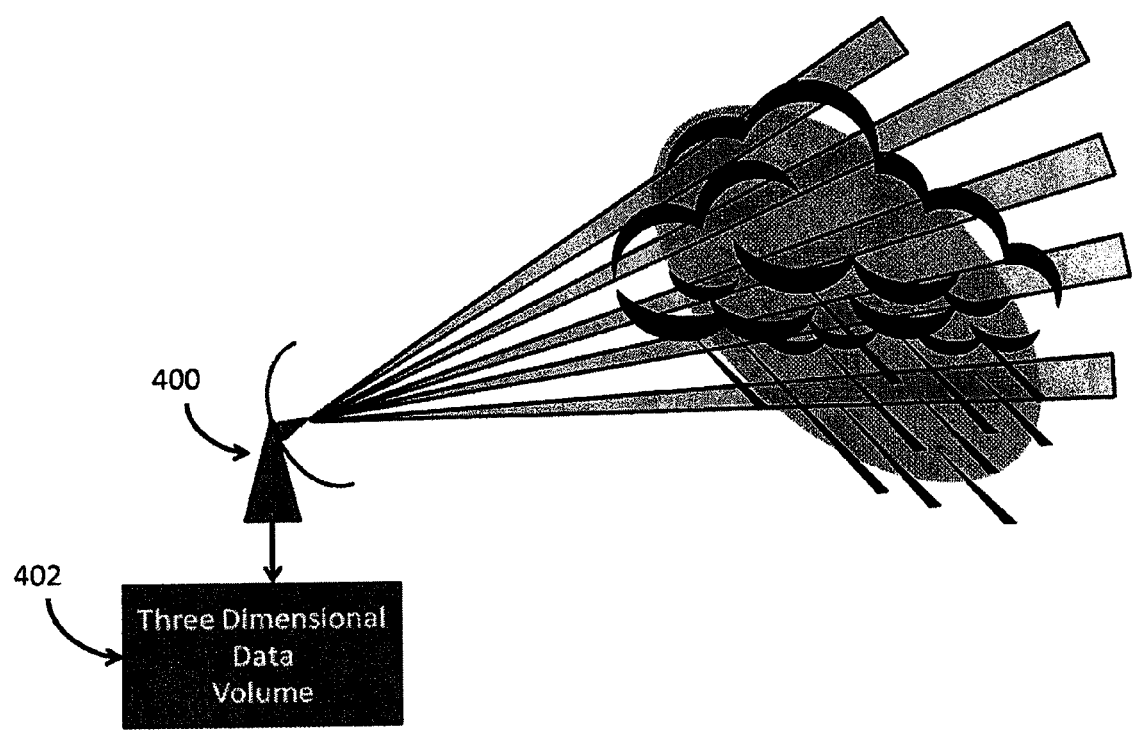
FIG. 4 is a diagram showing how the radar obtains a volume of atmospheric data.

FIG. 4 shows a diagram of how a radar system 400 collects samples of the atmosphere with a number of different elevation slices, obtaining a three dimensional data volume 402. The radar system may have a mechanical positioning system like the National Weather Service WSR-88D NEXRAD which will rotate the antenna in a full 360 degree circle at different elevation angles to obtain the three dimensional volume 402. The radar may be a phased-array radar such as the Navy SPY-1 or the Multifunction Phased Array Radar (MPAR) which is being designed to replace the WSR-88D. A phased array radar has no moving parts, rather the beam is steered by changing the electrical properties of each element of the antenna. Irrespective of the radar type, each will sample the atmosphere producing a respective three dimensional data volume 402.

Figure 5:
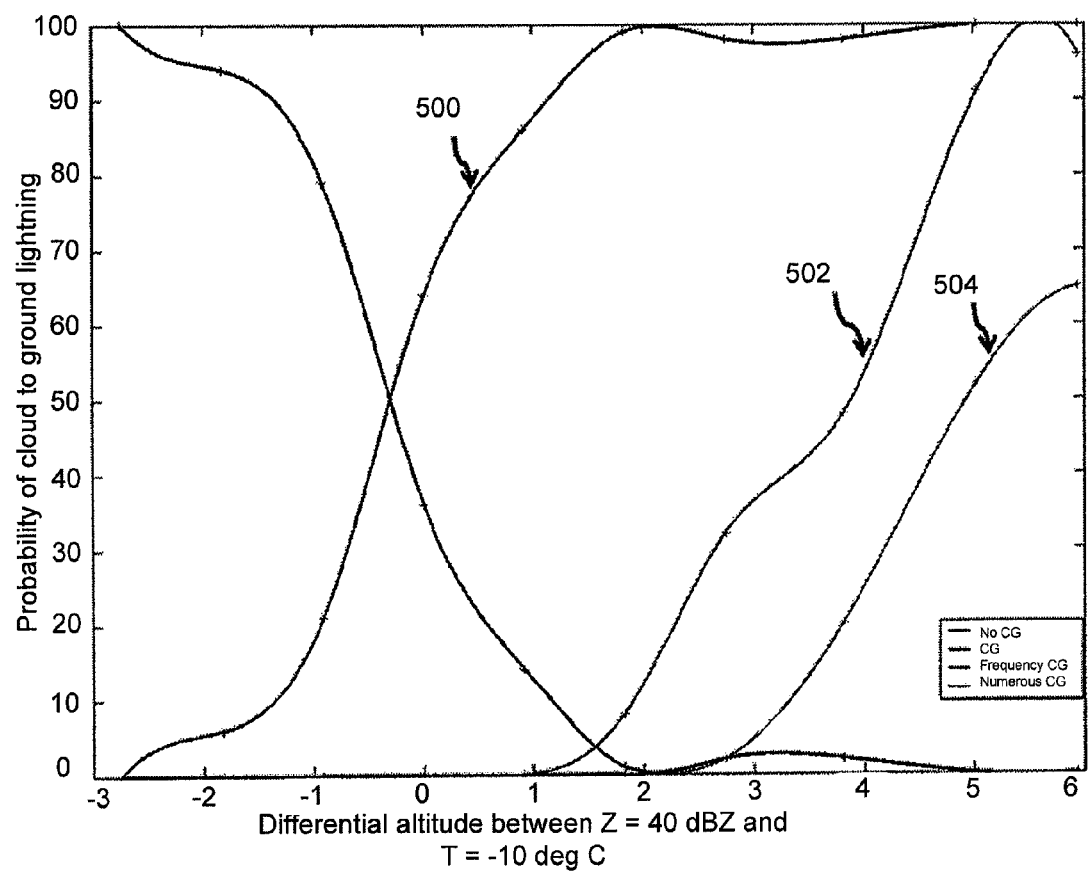
FIG. 5 is a diagram showing the probability density functions for predicting the probability of cloud-to-ground lightning.

FIG. 5 shows the probability density functions for the determining the probability of cloud-to-ground lightning discharge 500, the probability of 'frequent' (more than 2 per minute on average) cloud-to-ground lightning discharges 502 and the probability of 'numerous' (more than 4 per minute on average) cloud-to-ground lightning discharges 504. The probability density functions may be represented in a look-up table or mathematically with formulas in the memory of the computer 104 or 204. One significant aspect of the present invention is the computer-implemented application of the probability density function to the height difference data to generate lightning strike probability data. Those of ordinary skill in this art will understand that the probability density function may be derived in numerous ways, such as through experimental data extrapolation or interpolation, or curve-fitting techniques.

Figure 6:
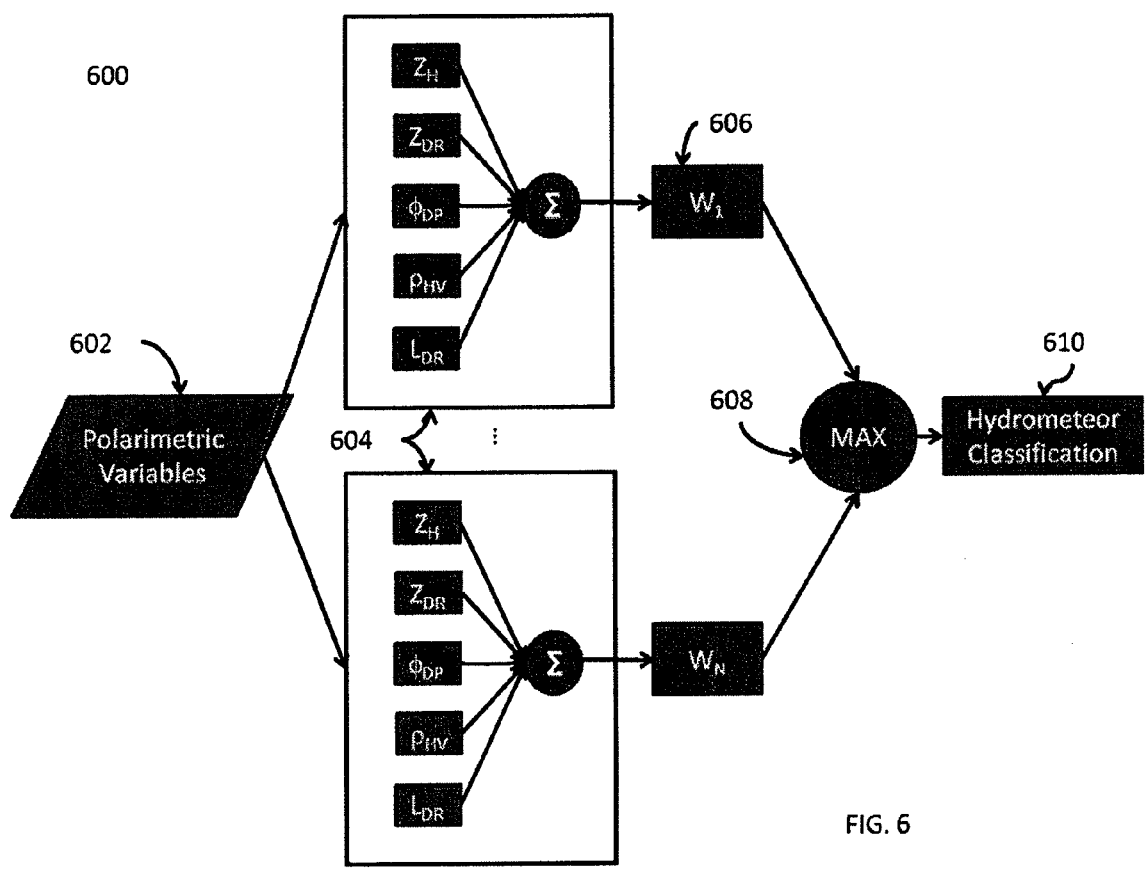
FIG. 6 is a flow diagram showing a method for classifying the hydrometeors.

FIG. 6 is a flow diagram showing a representative process for classifying hydrometeors 600. The process 600 can be performed by a computer 104 or 204 as it executes program code in its memory to process data. The important aspect is the hydrometeor classification 600, and other viable processes are possible. The process begins with the input of the polarimetric radar data 602 for variables such as ZH, ZDR, φDP, ρHV, LDR including horizontal reflectivity, radial velocity, spectrum width, differential reflectivity, differential propagation phase, co-polar correlation coefficient, and linear depolarization ratio if available. The polarimetric variables 602 are fed into a series of weighting functions 604. Representative weighting functions and factors used in the functions are described in Bringi and Chandrasekar, Polarimetric Weather Radar, Cambridge University Press, 2001; and J. William Conway, D. Nelson, J. J. Stagliano, A. V. Ryzhkov, L. Venkatramani, and D. Zrnic, 2005: A new C-band polarimetric radar with simultaneous transmission for hydrometeor classification and rainfall measurement, 32nd Conference on Radar Meteorology. There is one set of weighting functions 604 for each hydrometeor type. The result from each set of weighting functions is summed to give the likelihood 606 of the associated hydrometeor, indicated as W1-WN in FIG. 6. The maximum likelihood 608 determines the hydrometeor type. The resulting hydrometeor classification data 610 is output as the process determines the hydrometeor type.

Figure 7:
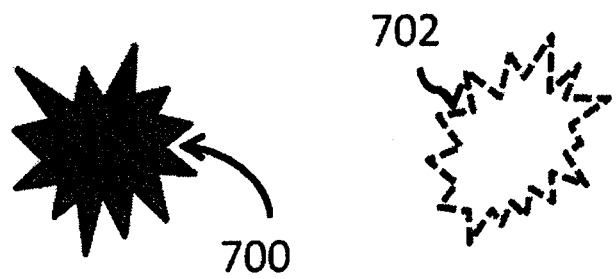
FIG. 7 shows an embodiment of a display of a computer system for the detection of a storm at a current time and a future time.

FIG. 7 shows the detection of a storm cell at the current time TC 700 and at some future time TF 702. The storm has undergone translational motion, changing its position from $\vec{x}_0$ to $\vec{x}_T$. The speed of the velocity of the cell motion vcell is given by the standard Newtonian formula, namely:

$$v_{cell} = \frac{(\vec{x}_T - \vec{x}_0)}{(T_F - T_C)}.$$

Figure 8:
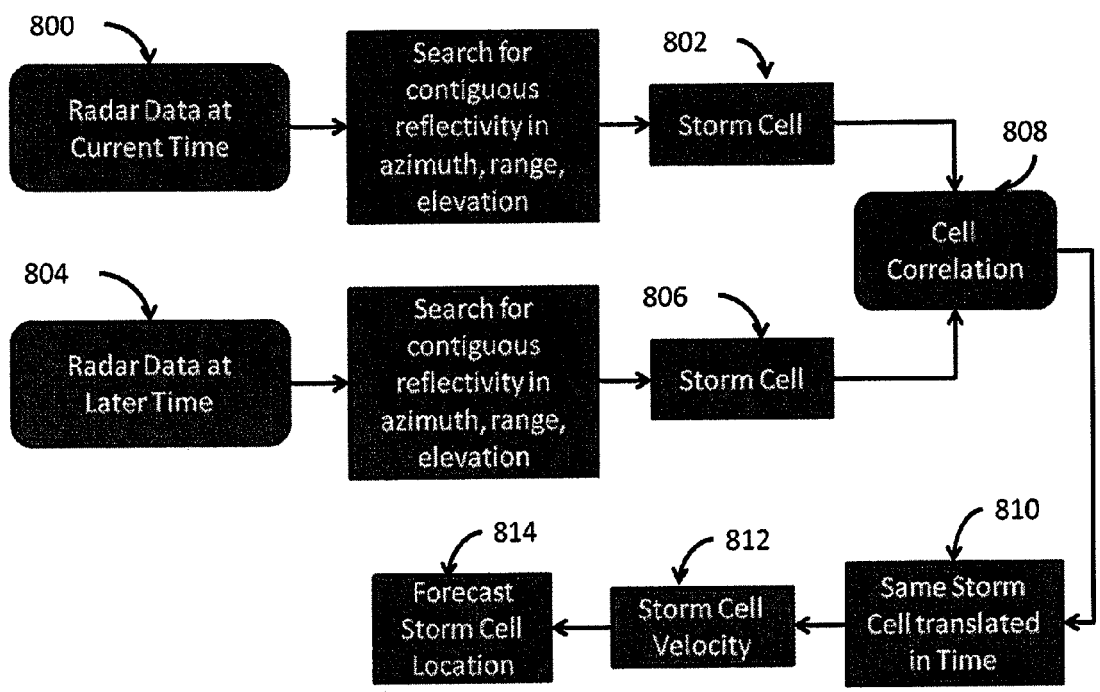
FIG. 8 is a flow diagram of a basic storm location prediction module based upon the storm track properties.

FIG. 8 is a flow diagram of a representative storm tracking process 800. The process 800 can be performed by a computer 104 or 204 as it executes program code in its memory to process radar data. Radar data at the current time 801 is searched for regions of significant reflectivity in azimuth, range and elevation. Such regions are designated a storm cell 802. Attributes of the storm cell are identified including its location, size, maximum height, maximum reflectivity value, radial velocity, Vertically Integrated Liquid (VIL) value, lightning threats and a number of other possible attributes. This process is repeated for radar data collected at a later time 804 identifying storm cells 806 for the later time. The attributes for the storm cells at the current time 802 and those with the later time 806 are compared and correlations between the cells are determined 808. Storm cells with high correlations are considered to be the same cell translated in time 810. Additional attributes including cell velocity 812 and development phase are subsequently determined. Standard Newtonian formulas are used to predict the future cell position 814.

Figure 9:
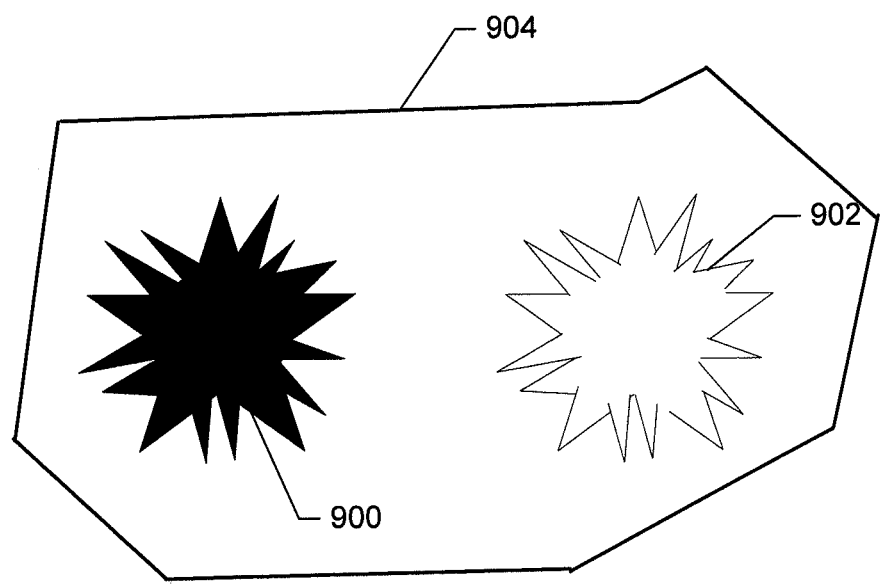
FIG. 9 is a diagram showing how the lightning threat warning area is defined based upon storm track properties.

FIG. 9 shows a representative graphical lightning threat warning process based upon the disclosed invention herein in combination with a storm tracking system. A storm cell showing a lightning threat 900 is determined by the method for predicting the probability for cloud-to-ground lightning. The storm track system forecasts the future location of the storm cell 902. The lightning threat warning 904 is displayed over an area encompassing the current cell location 900 and the future forecast location 902. The storm cell 902 and lightning threat warning 904 may be output from computer 104 or 204 to the visualization system 112 or 214 to generate a display representing the storm cell 902 and lightning threat warning 904 in association with the impacted geographic area. The visualization system 112 or 214 can be computer- or television-based, presenting a geo-referenced graphical display of the lightning threat area and/or a text based scroll across the display. Alternatively, or in addition to the visualization system 112 or 214, the computer 104 or 204 may be configured to output the storm cell 902 and lightning threat warning 904 to a warning system 114 or 216 serving the geographic area in which lightning strikes are imminent. For example, the warning system 114 or 216 may be implemented as a caller to dial telephones, or to send text messages, or fax messages, to a radio station in the impacted area, based on a text file or other data from the computer 104 or 204. The data may be transmitted via satellite to radio receivers or GPS devices (for example, wxWorx by Baron Services). In this way, the visualization system or warning system can be used to advise persons in the affected area that lightning strikes are probable or imminent. The inventive system and method can thus be used to prevent serious injury to persons, livestock, pets or property due to lightning strikes. Moreover, the inventive system and method can predict with a relatively high degree of accuracy that a lightning strike is probable or imminent, thus decreasing risk of false alarms and ensuring that proper measures are taken to mitigate the risk to persons or property in the affected areas.

Figure 10:
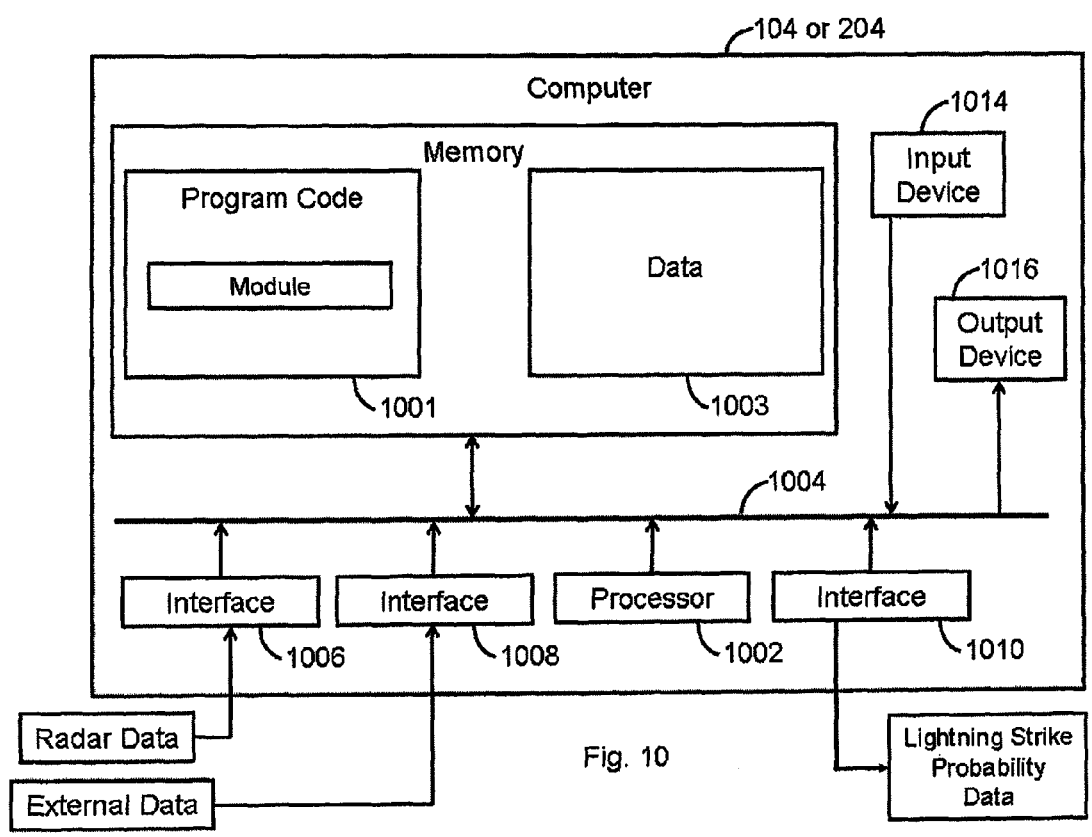
FIG. 10 is a generalized block diagram of a computer configured to implement the modules and processes of the foregoing Figures.

FIG. 10 is a generalized block diagram of a computer 104 or 204 configured to implement the modules and processes described herein. The computer 104 or 204 comprises a memory 1000 and processor 1002. The processor 1002 is connected to the memory 1000 via bus 1004. Also attached to the bus are interfaces 1006 connected to receive radar data from a radar system, and an interface 1008 connected to receive external data indicating minimum ice crystal altitude. The processor 1002 receives the radar data and external data and stores the same in the memory 1000. Further, the processor 1002 executes the program code 1001 which is configured to implement one or more of the modules and processes described herein. This may include the radar product module 106 or lightning threat module 108, or both, for the embodiment of FIG. 1, or it may include the elements 206 or 210, or both, for the embodiment of FIG. 2. As the processor 1002 executes the program code 1001, it processes data 1003 including the radar data and any external data, and generates intermediate data results. The intermediate data may include radar product data (FIG. 6), hydrometeor classification data (FIG. 3), polarimetric data volume (FIG. 3), maximum graupel altitude (FIG. 3), minimum ice crystal altitude (FIG. 3), −10° C. level (FIG. 3), and height difference (FIG. 3). The intermediate data is ultimately processed by the processor 1002 to generate lightning state probability data. As explained, the processor 1002 may perform this action by operating on the height difference using one or more of the probability density functions 500, 502, 504 of FIG. 5. The probability density functions may be implemented in program code 1001, or as data 1003 in the case of a look-up table. Thus, for example, the lightning state probability data may indicate the probability of any lighting strikes, the probability of frequent lighting strikes, or the probability of numerous lightning strikes, as previously defined. The processor 1002 stores the resulting lightning strike probability data in the memory 1000 as data 1003. Moreover, the processor 1002 outputs the lightning strike probability data to the visualization system 112 or 214. The light strike probability data may be geo-referenced by computer 104 or 204 using geographic or map data to generate a display of the geographic area threatened by lightning strikes. Alternatively, or in addition, the processor 1002 may be configured to output the lightning strike probability data to a warning system 114 or 216 via interface 1010 to advise persons in the threatened geographic area of predicted or impending lightning strikes. The computer 104 or 204 of FIG. 10 may be equipped with an input device 1014 such as a keyboard or mouse for inputting data or program code to the memory 1000. The computer 104 or 204 of FIG. 10 may also be equipped with an output device 1016 to generate a display of program code or data input by the user. The output device 1016 may also receive and display geo-referenced lighting threat probability data from the processor 1002 for display. The input device 1014 and output device 1016, in connection with the program code that runs them, may thus be regarded as the user interface of computer 104 or 204. Other standard features, such as an operating system or environment and binary input-output system (BIOS), a graphics card, co-processor, etc., are not shown in FIG. 10 for simplification. Those of ordinary skill in the art understand that such elements may be present in the computer 104 or 204.

While the invention has been shown in embodiments described herein, it will be obvious to those skilled in the art that the invention is not so limited but may be modified with various changes that are still within the spirit of the invention.

Having set forth the nature of the invention, what is claimed is:

1. A computer-implemented method of displaying a probability of cloud-to-ground lightning comprising:

displaying on a visualization device the probability of cloud-to-ground lightning discharges in a predetermined geographic area with respect to a geographic map; and superimposing upon the visualization device geographic structures such that locations of the probability of cloud-to-ground lightning discharges may be visually compared to locations of structures, wherein the probability of cloud-to-ground lightning discharges is determined by receiving polarimetric radar data and executing a cloud-to-ground lightning probability module to compare a maximum height of graupel to a minimum height of ice crystals and to apply a probability density function.

2. The computer-implemented method of claim 1, further comprising predicting the probability of cloud-to-ground lightning discharges based upon polarimetric radar data.

3. The computer-implemented method of claim 1, further comprising predicting the probability of cloud-to-ground lightning discharges based upon polarimetric radar data and temperature data.

4. The computer-implemented method of claim 3, wherein predicting the probability comprises:
determining location and velocity of a current cell;
forecasting a future location of the cell using Newtonian mechanics; and
designating an area around the current cell through an area of the future location of the cell as an area with the probability of cloud-to-ground lightning discharges based upon polarimetric radar data and temperature data.

5. The computer-implemented method of claim 4, wherein the probability of cloud-to-ground lightning discharges is determined using a maximum height of graupel particles and minimum height of ice crystal particles.

6. The computer-implemented method of claim 1, wherein displaying comprises displaying on the visualization device the probability of frequent (greater than 2 strikes per minute on average) cloud-to-ground lightning discharges in a predetermined geographic area with respect to a geographic map; and superimposing comprises superimposing upon the visualization device geographic structures such that the locations of the probability of frequent (greater than 2 strikes per minute on average) cloud-to-ground lightning discharges may be visually compared to the locations of structures.

7. The computer-implemented method of claim 1, wherein displaying comprises displaying on the visualization device the probability of numerous (greater than 4 strikes per minute on average) cloud-to-ground lightning discharges in a predetermined geographic area with respect to a geographic map, and superimposing comprises superimposing upon the visualization device geographic structures such that the locations of the probability of numerous (greater than 4 strikes per minute on average) cloud-to-ground lightning discharges may be visually compared to the locations of structures.

8. A system for predicting a probability of cloud-to-ground lightning discharge comprising:
a computer including
a memory configured to store program code and data; and
a processor configured to receive polarimetric radar data, the processor further configured to execute a cloud-to-ground lightning probability module to compare a maximum height of graupel to a minimum height of ice crystals and to apply a probability density function to determine the probability of cloud-to-ground lightning discharges.

9. The system of claim 8, wherein the processor is configured to execute a prediction module within the program code to predict the future location of storm cells and includes future cells in the cloud-to-ground lightning threat warning area.

10. The system of claim 9, wherein the processor is configured to execute the prediction module to search for contiguous regions of reflectivity in azimuth, range, and altitude for storm cells at the current time and a future time, and to correlate the cells to determine cell characteristics including motion vectors which are used to predict future locations with the probability of cloud-to-ground discharge.

11. A non-transitory computer-readable medium that comprises computer instructions that when executed in a computer cause the computer to perform:
receiving polarimetric radar data including horizontal reflectivity, radial velocity, spectrum width, differential reflectivity, differential propagation phase, co-polar correlation coefficient, and linear depolarization ratio if available;
identifying hydrometeor types using the data received;
determining a maximum height attained by graupel determined in identifying the hydrometer types for each vertical column;
determining a minimum height of ice crystals determined in identifying the hydrometer types in a volume;
finding a height difference for each vertical column between data determined in determining the maximum height and determining the minimum height;
applying a probability density functions to the results of the height difference found to determine a probability of any cloud-to-ground lightning discharge, frequent (more than 2 strikes per minute on average) cloud-to-ground lightning discharges, and numerous (more than 4 strikes per minute on average) cloud-to-ground lightning strikes; and
displaying the results of the determined probability on a graphical warning system.

12. The computer-readable medium of claim 11, wherein the computer-readable medium is configured to store computer instructions for execution of determining the minimum height of the ice crystals using the height of the freezing level, a temperature of $-10°$ C.

13. The computer-readable medium of claim 11, wherein the computer-readable medium is configured to store computer instructions for displaying structures on a computer visualization system describing the lightning threat level.

14. The computer-readable medium of claim 11, wherein the computer-readable medium is configured to store computer instructions for execution by the computer to perform:
predicting a future location of storm cells; and
using the predicted future cell locations to predict future lightning threat areas.

15. A computer-implemented method comprising the steps of:
receiving a polarimetric data volume representing radar returns from an atmospheric area containing one or more hydrometeors;
determining a maximum altitude of graupel particles in the hydrometeors from the data volume;
determining a minimum altitude of ice crystals in the hydrometeors;
determining a height difference between the maximum altitude of graupel particles and the minimum altitude of ice crystals in the hydrometeor; and
applying a probability density function to the height difference to generate data indicating a probability of cloud-to-ground lightning strikes.

16. The computer-implemented method of claim 15, wherein the determining of the minimum altitude is performed based on the data volume.

17. The computer-implemented method of claim 15, further comprising:
    receiving data indicating a minimum altitude of ice crystals in the hydrometeor,
    wherein the minimum altitude of ice crystals is determined based on the data received.

18. The computer-implemented method of claim 15, wherein the probability density function is configured to generate data indicating the probability of any cloud-to-ground lightning strikes.

19. The computer-implemented method of claim 15, wherein the probability density function is configured to generate data indicating the probability of 'frequent' cloud-to-ground lightning strikes.

20. The computer-implemented method of claim 15, wherein the probability density function is configured to generate data indicating the probability of 'numerous' cloud-to-ground lightning strikes.

* * * * *